Oct. 30, 1956

J. M. PATTERSON 2,768,859

SPRAYING APPARATUS

Filed June 15, 1954

FIG_1

FIG_6

INVENTOR
JOSEPH M. PATTERSON

BY *Hans G. Hoffmeister*

ATTORNEY

Oct. 30, 1956 J. M. PATTERSON 2,768,859
SPRAYING APPARATUS
Filed June 15, 1954 6 Sheets-Sheet 2
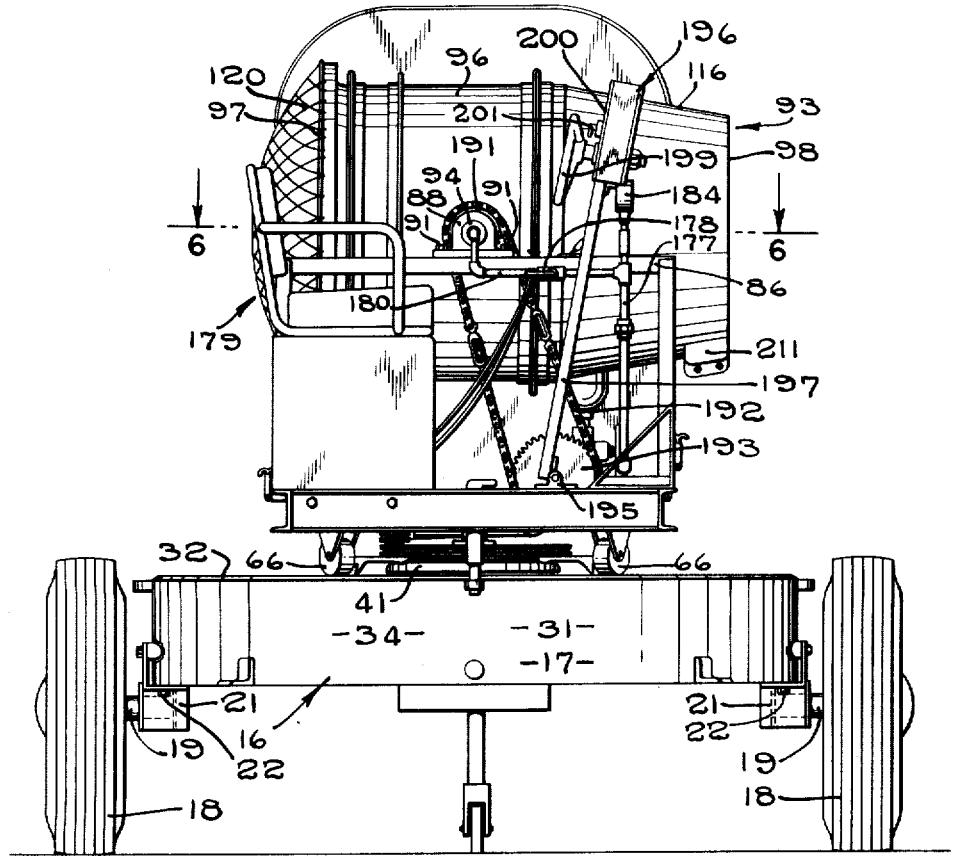
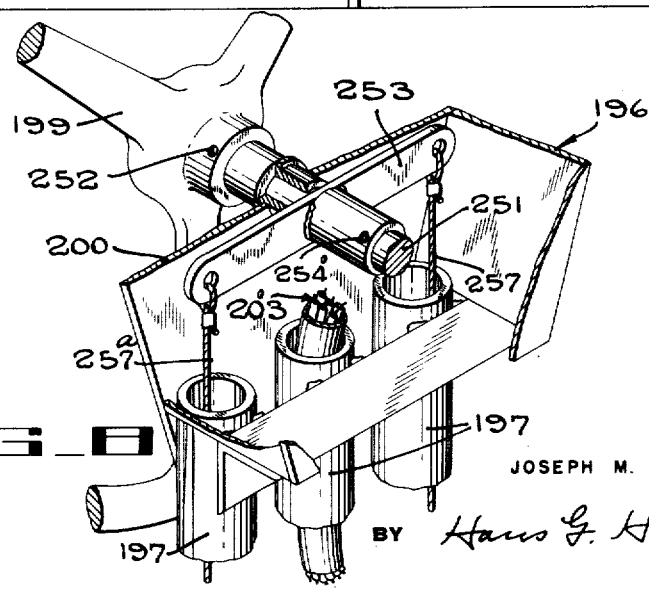
INVENTOR
JOSEPH M. PATTERSON
BY Hans G. Hoffmeister
ATTORNEY Oct. 30, 1956  J. M. PATTERSON  2,768,859
SPRAYING APPARATUS
Filed June 15, 1954  6 Sheets-Sheet 3
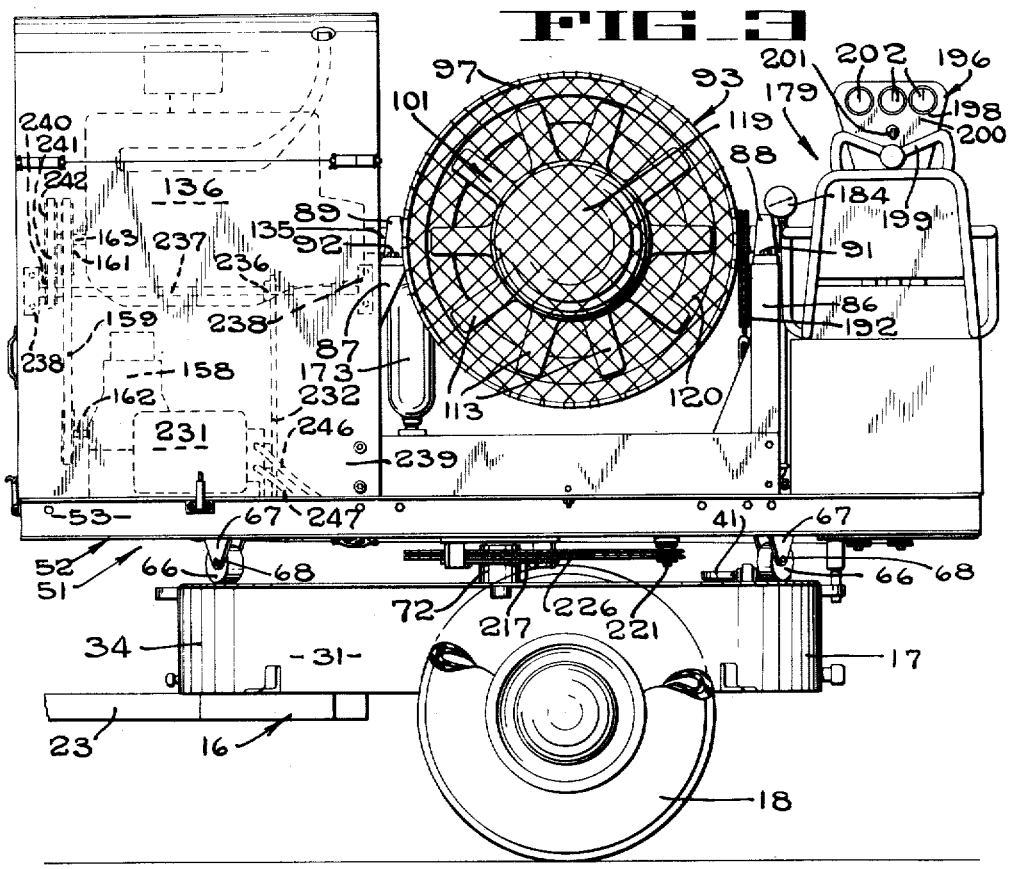
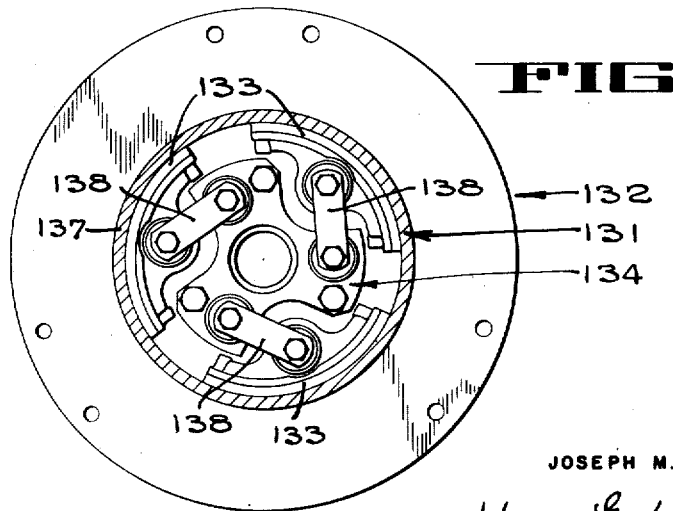
INVENTOR
JOSEPH M. PATTERSON
BY Hans G. Hoffmeister
ATTORNEY

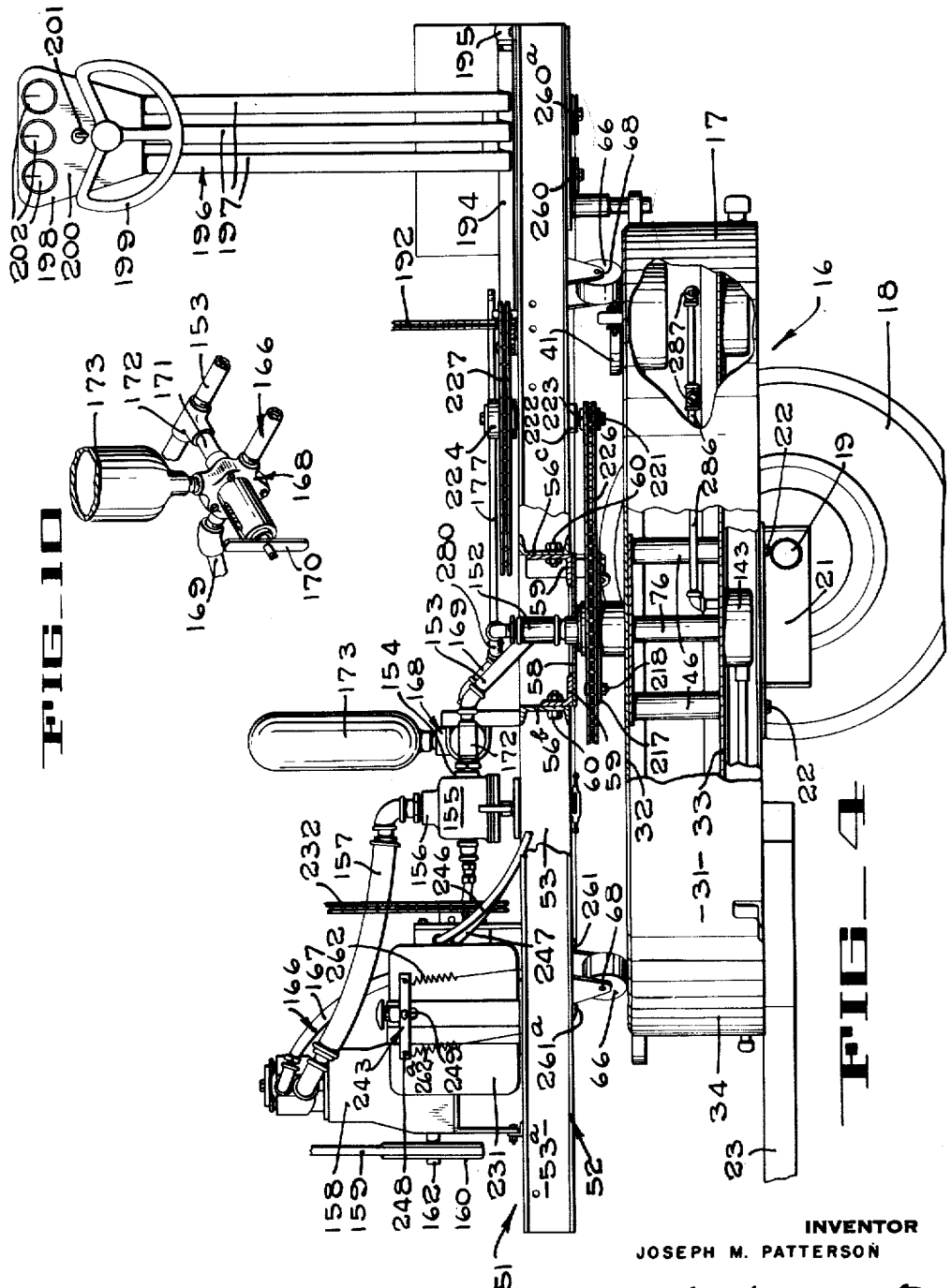

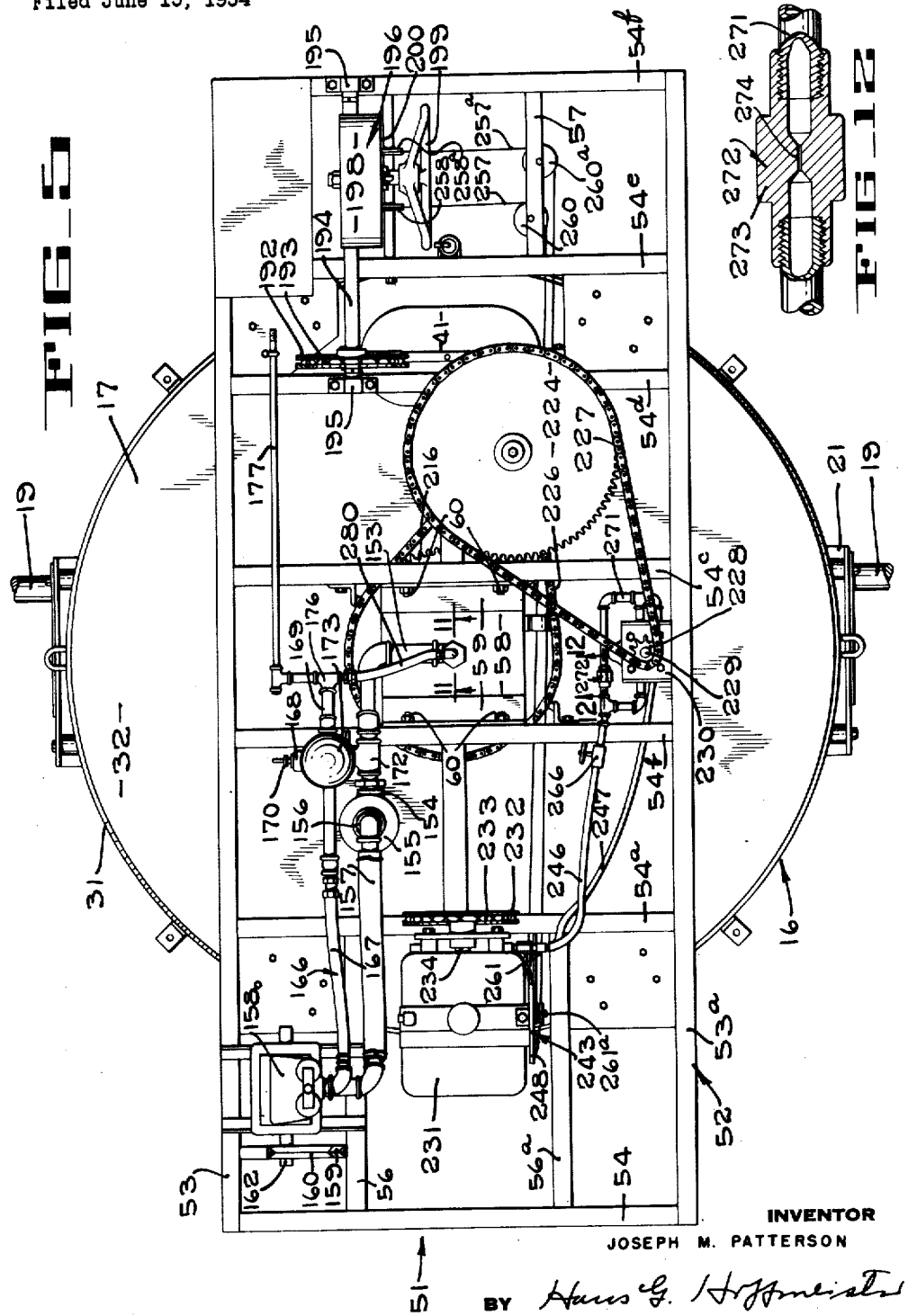

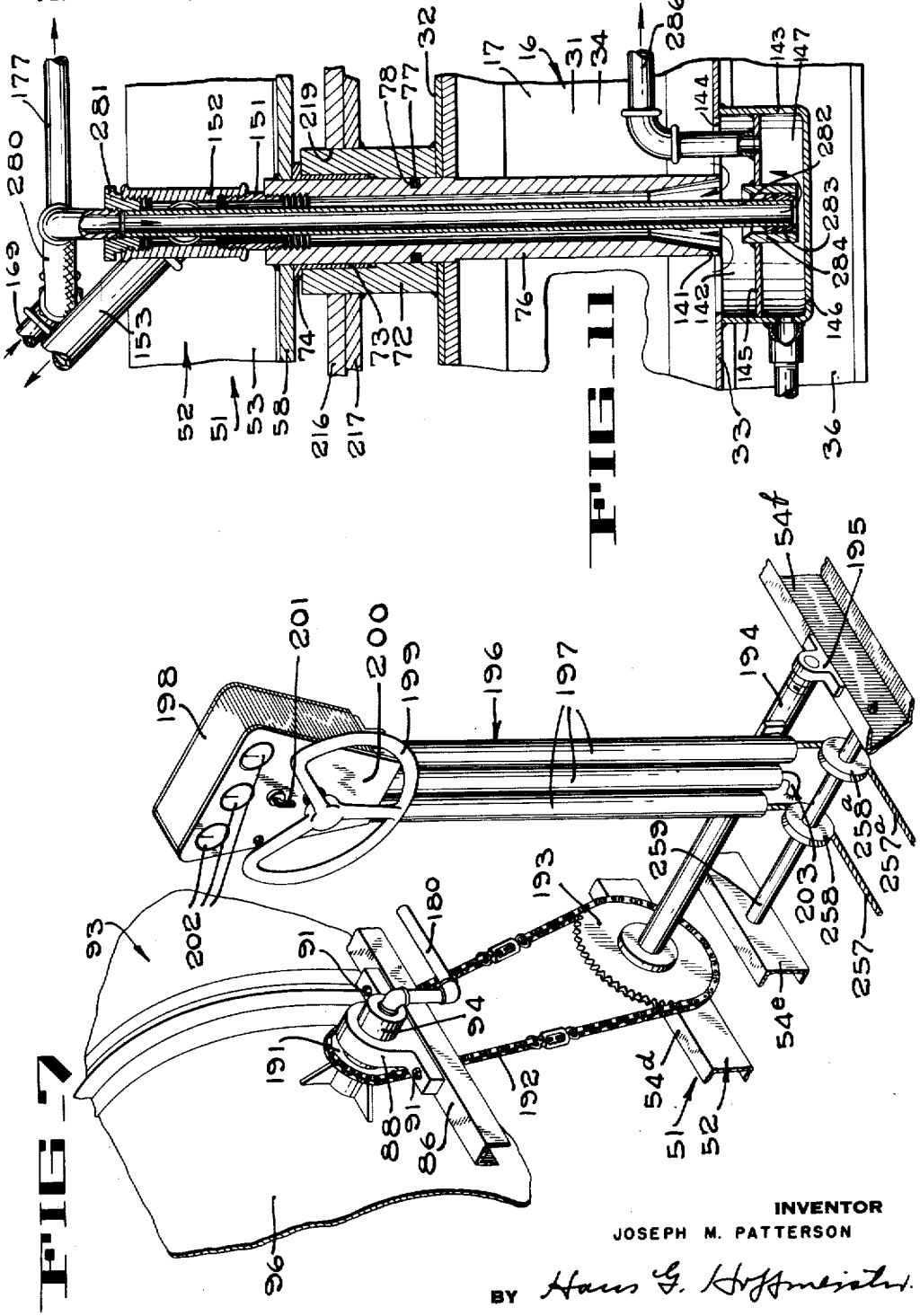

United States Patent Office 2,768,859
Patented Oct. 30, 1956

2,768,859

SPRAYING APPARATUS

Joseph M. Patterson, Lansing, Mich., assignor to Food Machinery and Chemical Corporation, San Jose, Calif., a corporation of Delaware Application June 15, 1954, Serial No. 436,812

26 Claims. (Cl. 299—42)

The invention relates to spraying apparatus, and more particularly to machines for delivering a chemical laden air blast to relatively inaccessible objects.

An object of the present invention is to provide a new and improved spraying machine.

Another object is to provide spraying apparatus effective to direct a chemical laden air stream to regions beyond the range of spraying machines of earlier design.

Another object is to provide a spraying machine particularly adapted for but not necessarily limited to the application of insect and disease controlling spray materials to tall trees.

Another object is to provide a vehicle suported, power operated spraying machine adapted to apply agricultural and other chemicals by means of a stream or jet of air sufficiently narrow, or concentrated, and moving at a sufficiently high velocity, to carry to greater distances than can be reached by spraying machines now in common use.

Another object is to provide a spraying machine of the general character indicated, in which the operating parts are mounted upon a turntable rotatable about a vertical axis to assist in directional control of the chemical laden air stream, and equipped with power actuated, operator controlled means for turning the turntable.

Another object is to provide a spraying machine with novel and convenient controls whereby an operator is enabled to direct the high velocity chemical laden air stream accurately onto or into a desired target area.

Another object is to provide power operated spraying equipment with controls arranged in such a manner as to facilitate keeping them, the desired target area, and the entire extent of the air stream, within the range of the operator's observation.

Another object is to provide a power operated spraying machine in which the reaction force opposing the force applied to a blower is utilized to assist in exercising directional control over the air stream created thereby.

Another object is to provide so called "dead man" controls for a power operated spraying machine, i. e., controls so connected to their associated mechanisms that when released they automatically move to neutral or intermediate positions, where they remain until manually removed therefrom.

Another object is to construct the relatively stationary base on which the turntable is mounted, in the form of a tank for storage of the chemical to be applied, and to provide means for withdrawing the chemical from the tank and delivering the same to the ejecting mechanism carried by the rotatable turntable.

Another object is to provide means for agitating the supply of chemicals stored in the tank, to maintain the chemicals in a thoroughly mixed condition.

These and other objects and advantages of the invention will become apparent from the following description and the accompanying drawings in which:

Figure 1 is a perspective of a spraying machine embodying the invention, viewed from the rear and one side.

Figure 2 is a rear elevation.

Figure 3 is a side elevation viewed from the left in Fig. 2.

Figure 4 is a side elevation, viewed as in Fig. 3 but with parts removed and broken away to reveal operating structure.

Figure 5 is a plan view of the mechanism of Fig. 4.

Figure 6 is a horizontal section taken through the blower assembly along the lines 6—6 of Fig. 2.

Figure 7 is a perspective showing the mechanism for attaining directional control of the chemical laden air stream.

Figure 8 is a detail view, partly broken away, showing a portion of the directional control mechanism of Fig. 7.

Figure 9 is a detail view in vertical section taken along the lines 9—9 of Fig. 6.

Figure 10 is a detail perspective, partly broken away, of the pressure relief valve and the surge chamber employed in the system for supplying spraying materials to the blower assembly.

Figure 11 is an enlarged vertical section taken medially through the central journal bearing of the turntable along the lines 11—11 of Fig. 5.

Figure 12 is a detail view taken on the lines 12—12 of Fig. 5.

As shown in Figs. 1 to 5, inclusive, of the drawings the spraying machine of the invention is mounted on a chassis indicated generally at 16 comprising a body portion 17 supported on wheels 18 rotatable on axially aligned stub shafts or axles 19, each of which is secured rigidly to the body portion 17 by being secured at its inner end to a rectangular frame structure 21 fastened to the under side of the body portion 17 by bolts 22 (Figs. 2 and 4). A towing tongue 23 rigid with the body portion 17 extends forward from the front end thereof and is provided with a suitable coupling device 24 (Fig. 1) for attaching the spraying machine to a towing vehicle. A vertical rod 26 extends slidably through a tubular guide 27 adjacent the front end of the tongue 23 and is adapted to be raised to retracted position or to be lowered to tongue-supporting position by a rack and pinion construction (not shown) operated by a hand crank 28. A caster wheel 29 at the lower end of the tongue supporting rod 26 facilitates maneuvering the spraying machine by hand when it is disconnected from the towing machine.

The body portion 17 of the chassis 16 is in the form of a tank 31 comprised of top and bottom walls 32 and 33, respectively (Figs. 4 and 11), of circular patern, interconnected by an annular peripheral wall 34 the lower portion of which extends downward past the bottom wall 33 to present a skirt 36. Horizontal structural members 37 concealed by the skirt 36 support the tank 31 on the two rectangular frame structures 21. The tank 31 is of liquid-tight construction and the top 32 of the same is provided with a filler opening having a removable cover 41 (Figs. 4 and 5) which permits filling the tank with the material to be sprayed, generally liquid or a mixture of liquid and solid particles suspended therein. Suitable bracing members 46 rigidly interconnecting the top and bottom walls 32 and 33 of the tank 31 assist in distributing weight imposed on the top 32 over the full extent of the structural members 37 and thereby contribute toward maintaining the tank top 32 in a flat condition to serve as a suitable support for a turntable 51 rotatably mounted thereon.

The frame 52 of the turntable 51 comprises two side members 53 and 53a of channel section retained in spaced parallel relation by a plurality of transversely extending channel members 54, 54a, 54b, 54c, 54d, 54e, and 54f. The transverse frame member 54 at one end of the frame 52 and the next adjacent transverse member 54a are interconnected by two spaced parallel longitudinal bracing members 56 and 56a; and the transverse member 54f at the opposite end of the frame 52 is similarly connected to the next adjacent transverse member 54e by a supplementary longitudinally extending bracing member 57. The two intermediate transverse frame members 54b and 54c are interconnected by a plate 58 (Figs. 4 and 5) secured along both edges to angle irons 59 adjustably affixed to the intermediate transverse members 54b and 54c by bolts 60.

The turntable 51 is rotatably supported upon the tank top 32 by means of a plurality of rollers 66 each of which is rotatable within a bracket 67 extending downward from the under surface of the turntable frame 52, and bears against the top plate 32 of the tank 31 in rolling contact therewith. The several rollers 66 are arranged at suitable angular intervals about the central vertical axis of the tank 31 and are disposed adjacent the peripheral edge thereof. The several pivot pins 68 whereby the rollers 66 are mounted in their respective brackets 67 extend radially with respect to the center of the tank 31 so that whereas they support at least a substantial portion of the weight of the turntable 51 and the load carried thereby, they are free to roll circumferentially of the tank 31 and thereby support the turntable 51 for rotation about the tank's axis.

Also contributing to the support of the turntable 51 and its load is a sleeve 72 (Fig. 11) secured to the tank top 32 with its axis extending vertically through the center of the same. A bushing 73 of suitable wear-resistant material such as bronze impregnated with lubricant, is fitted within the upper end of the sleeve and has a radially extending flange 74 seated on the upper end of the sleeve 72. The plate 58 of the turntable frame 52 is slidably supported on the upper surface of the flange 74 of the bushing 73, and is so adjusted with respect to the remainder of the turntable frame 52 that it transmits a substantial portion of the weight of the turntable 51 and its load to the tank top 32 through the bushing 73 and sleeve 72.

A tubular spindle 76 affixed to the plate 58 at the center of the turntable 52, extends rigidly downward therefrom through the sleeve 72 within which it is rotatably fitted. A packing ring 77 seated in a groove 78 in the outer circumferential wall of the spindle 76 engages the bore of the sleeve 72 to establish a fluid-tight seal between the spindle and sleeve to protect the bearing surfaces of the bushing 73 and plate 58 from corrosive action of the spray chemicals contained within the tank 31.

Two upstanding frame members 86 and 87 (Figs. 1, 2 and 3) are rigidly mounted upon the frame 52 of the turntable 51 in longitudinally spaced relation thereon and are provided with axially aligned bearings 88 and 89, respectively, rigidly mounted as by bolts 91 and 92, respectively, upon their upper ends. A blower assembly indicated in its entirety at 93 is mounted for rotational adjustment about the horizontal axis common to both bearings 88 and 89 by means of tubular trunnions 94 and 95 rigid with the casing 96 of the blower 93 and extending radially outward therefrom and rotatably journaled within the bearings 88 and 89, respectively. The casing 96 of the blower assembly 93 is of tubular form and is open at both its inlet end 97 and at its outlet end 98, thus defining a "straight through" blower housing or tunnel, which is conducive to high efficiency of the blower assembly in generating and directing a high velocity air stream.

A propeller 101 is mounted within the casing 96 adjacent the inlet end 97 thereof, for rotation about an axis coinciding with that of the casing. The propeller 101 is supported upon a shaft 102 (Fig. 6) to which it is secured by a key 103 and a nut 104; and the shaft 102 is rotatably supported by and extends rearwardly from a gear housing 106 supported within an inner casing or shell 107 by means of a suitable bracket 108 extending transversely of the shell 107 in a position sufficiently spaced below the axis thereof to support the gear housing 106 with the axis of the shaft 102 in coincidence with that of the shell 107. The shell 107 is supported in coaxial alignment with the outer casing 96 by plurality of substantially radially disposed fins 109 extending between the two casings 96 and 107.

The hub portion 111 of the propeller 101 includes a circumferential rim 112 constituting a substantial continuation of the shell 107, and a plurality of impeller blades 113 extending radially from the rim 112 and so pitched that upon rotation of the shaft 102 they generate a blast of air of annular cross section moving to the right as viewed in Fig. 6, and encompassing the shell 107.

The blast of air has a tendency to follow a spiral path through the casing 96 due to the rotary motion of the impeller blades 113; but this tendency is overcome by the shell-supporting vanes 109 which are slightly pitched in the direction opposing such spiral motion of the air blast. Therefore, as the blast of air approaches the after portion 116 of the casing 96 it is characterized by a minimum of turbulence and by a direction of flow substantially parallel to the axis of the casing 96. The after portion 116 of the casing 96 is of tapering form and defines a relatively restricted discharge orifice 117. The after end 118 of the shell 107 likewise is of tapering form, so that it cooperates with the tapering after portion 116 of the casing 96 to condense or restrict the blast of air as it approaches the discharge orifice 117, not only increasing its velocity but also transforming it from an annular cross sectional pattern to a solid jet of air of substantially uniform density and velocity throughout its entire cross section, the value of which lies in its ability to penetrate the surrounding relatively still air and thus carry to relatively great distances as compared to the air stream produced by more usual spraying machines.

A dome shaped spinner 119 of sheet metal encloses the hub 111 of the propeller 101 and contributes to the streamlined efficiency of the entire blower assembly 93 in producing a smoothly flowing high velocity air stream of large volume. A safety screen 120 covers the inlet end 97 of the blower assembly 93.

The propeller shaft 102 is driven by a shaft 126 extending radially from the gear housing 106 and operatively connected to the propeller shaft 102 by intermeshing bevel gears 127 and 128 enclosed within the gear housing 106. The shaft 126 is connected to a coaxially disposed drive shaft 129 by a suitable coupling 130 disposed between the outer casing 96 and the shell 107. The drive shaft 129 extends through the tubular trunnion 95 with respect to which it is free to rotate, and is connected to the driven member 131 (Fig. 9) of a centrifugal clutch 132 comprising a plurality of friction shoes 133 carried by the driving member 134 of the clutch 132 which is mounted upon the outboard end of the drive shaft 135 of an internal combustion engine 136 (Fig. 3) mounted adjacent one end of the turntable 51. The centrifugal clutch 132 is adapted to interconnect the shafts 129 and 135 for simultaneous and coextensive rotation when the friction shoes 133 are forced outward by centrifugal action by rotation of the driving member 134, so as to establish frictional engagement with the driven member 131 which is in the nature of a housing having an outer circumferential wall 137 enclosing the shoes 133 and the link members 138 whereby the shoes 133 are floatingly connected to the driving clutch member 134 in such a manner as to permit freedom of radial movement of the shoes 133 but to cause rotation of the shoes 133 with the driving member 134.

Means are provided for withdrawing liquid pesticide stored within the tank 31 and delivering the same into the blast of air issuing from the blower assembly 93.

The vertically disposed tubular spindle 76 to which reference has been made hereinabove, is of sufficient length to dispose its lower end 141 (Fig. 11) within a sump 142 defined by a cup-shaped housing 143 sealed to the bottom wall 33 of the tank 31 in registry with an opening 144 in the tank bottom 33. The bottom of the sump 142 is defined by a horizontal plate 145 extending across the housing 143 in spaced relation to the bottom 146 of the housing, separating the lower portion 147 of the housing from the sump 142 for a purpose which will be made apparent later herein.

The upper end of the tubular spindle 76 extends through the plate 58 of the turntable to which it is rigidly secured as already mentioned, and is connected by a nipple 151 (Fig. 11) to a T-fitting 152. From the T-fitting 152 suitable piping 153 leads to the inlet 154 of a strainer 155 (Figs. 4, 5 and 10), the outlet 156 of which is connected by a preferably flexible conduit 157 to the inlet of a pump 158 operated by a belt 159 trained around pulleys 160 and 161 (Fig. 3) mounted respectively on the pump shaft 162 and an extension 163 of the crankshaft of the motor 136. The pump 158 discharges to another conduit 166, which also preferably includes a flexible portion 167. The conduit 166 leads to a conventional pressure relief valve 168 (Figs. 5 and 10) which operates to release the fluid pesticide through a discharge conduit 169 at the predetermined pressure for which the valve 168 is set by manipulation of its regulating handle 170. Excess fluid delivered to the relief valve 168 by the conduit 166 over and above that required to keep the discharge conduit 169 supplied with fluid under such predetermined pressure is released through a bypass conduit 171 connected by a T-fitting 172 into the suction line 153.

A surge chamber 173 mounted on the pressure relief valve 168, is so connected into the piping system that a cushion of air entrapped within the chamber 173 absorbs shock or "water hammer" resulting from abrupt interruption of flow of liquid within the piping system whereby pesticide is withdrawn from the tank 31.

The discharge conduit 169 wherein constant working pressure is maintained by the relief valve 168, leads to another T-fitting 176 (Fig. 5), one outlet of which is connected by suitable tubing 177 to a control valve 178 (Figs. 1, 2 and 6) conveniently accessible to an operator seated at an operator's station 179 at the end of the turntable 52 opposite that on which the motor 136 is mounted. From the valve 178 tubing 180 leads through the tubular trunnion 94 to the interior of the blower casing 96 where it is connected by a suitable coupling 181 (Fig. 6) to one end of a length 182 of flexible tubing, the other end of which is connected to a spray nozzle 183 mounted at the apex of the tapering discharge end 118 of the shell 107 and arranged to discharge finely diffused liquid spray material into the air stream issuing from the discharge orifice 117. A pressure gauge 184 mounted in front of the operator's station 179 and connected to the pipe 177 enables the operator to keep himself informed that proper, operating pressure is maintained within the tubing system whereby the liquid insecticide is supplied to the jetting nozzle 183.

Means under the direct control of an operator seated at the operator's station 179 are provided for rotating the blower assembly 93 about the horizontal axis of the trunnions 94 and 95 to alter the elevation of the pesticide laden air stream issuing therefrom. As best shown in Fig. 7, a sprocket 191 rigid with the trunion 94 is operably connected by a chain 192 to a sprocket 193 rigidly mounted upon a shaft 194 journaled for rocking motion in bearings 195 secured to the frame 52 of the turntable 51 in front of the operator's station 179. A control column 196 comprising three parallel tubes 197 is rigidly secured adjacent its lower end to the shaft 194 and extends upward therefrom to mount a cabinet 198 on its upper end substantially at eye level in front of an operator seated at the station 179. The parts are so proportioned and arranged that the operator thus seated can comfortably grasp a wheel 199 rotatably mounted in the front panel 200 of the cabinet 198 so as to use the wheel 199 as a handle whereby to move the control column 196 toward or away from himself thus imparting rotary motion to the blower assembly 93 about its horizontal axis through the sprockets 191 and 193 and the chain 192 trained therearound.

The ignition switch 201 and appropriate indicating instruments 202 for the engine 136 are mounted on the front panel 200 of the cabinet 198, and are connected to the associated portions of, or accessories to, the motor 136 by insulated wiring 203 (Figs. 7 and 8) leading to the same through the intermediate tube 197 of the control column.

A counterweight 211 (Figs. 1, 2 and 6) is affixed to the under side of the blower assembly 93 adjacent the outlet end 98 thereof, and is so proportioned that when the machine is idle it is sufficiently heavy to effect turning the assembly 93 to that position in which the discharge orifice 117 is directed laterally downward with the counterweight 211 resting upon a portion of the turntable frame 52, where it may be releasably fastened by a hook 212. However, the direction of rotation of the drive shafts 135, 129 and 126 is such that the torque that is imparted to the blower assembly 93 as a consequence of the application of rotating effort to the gears 127 and 128, urges the blower assembly 93 to rotate in the opposite direction, i. e., to lift the counterweight 211. Moreover, the parts are so proportioned and arranged that when the motor 136 is operating at normal operating speed the torque thus applied to the blower assembly 93 by the drive shafts is equilibrated by the torque applied gravitationally by the counterweight 211 when the blower assembly is disposed at an intermediate angular position between its two extreme positions of rotational adjustment about the horizontal axis of its supporting trunnions 94 and 95. Consequently, if the operator releases his grasp upon the wheel 199 and thereby permits the control column 196 to swing freely while the motor 136 is operating at normal operating speed the blower assembly 93 will automatically assume the said predetermined position, moving the control column 196 likewise to a predetermined position from which it can be moved in either direction by the operator with a minimum of muscular effort. In this manner the operator is enabled to easily control the angle of elevation of the blower assembly 93 and thereby direct its stream of pesticide laden air at any desired angle within the limits of the mechanism.

An operator seated at the station 179 also has under his immediate control means for varying the horizontal direction of the pesticide laden air jet issuing from the blower assembly 93. For this purpose there is provided a sprocket wheel 216 (Figs. 1, 2, 3, 4, 5, and 11) rigidly secured to the sleeve 72 in coaxial relation therewith, below the turntable frame 52. The means for securing the sprocket wheel 216 to the sleeve 72 comprises a plate 217 welded to the sleeve 72, and a plurality of bolts 218 extending through both the sprocket wheel 216 and plate 217. The sprocket wheel 216 is provided with an axial hole 219 loosely fitted to the outside circumference of the sleeve 72 so that the sprocket wheel 216 can be removed and another sprocket wheel of different pitch diameter substituted therefor in order to attain a change in speed ratio of the driving mechanism for rotating the turntable. A vertical countershaft 221 is journaled in a bearing member 222 (Figs. 3 and 4) suitably mounted upon the turntable frame 52 at a location offset from the sprocket wheel 216; and this shaft 221 carries at its lower end a driving sprocket wheel 223 of relatively small pitch diameter, whereas a driven sprocket wheel 224 of relatively great pitch diameter is rigid with the shaft 221 adjacent the upper end of the same. A chain 226 is trained around the sprocket wheels 216 and 223;

and another chain 227 is trained around the large driving sprocket wheel 224 and also around a small driven sprocket wheel 228 carried by the shaft 229 of a reversible fluid motor 230 (Fig. 5) suitably mounted on the turntable frame 52.

A hydraulic pump 231 likewise mounted on the turntable frame 52 is operated by means of a chain 232 trained around a sprocket 233 rigid with the shaft 234 of the hydraulic pump 231 and also trained around a driving sprocket 236 (Fig. 3) rigid with a countershaft 237 journaled in bearings 238 mounted inside the motor housing 239 and carrying a sprocket wheel 240 operably connected by a chain 241 to a sprocket 242 rigidly mounted upon the motor shaft 163 adjacent the sprocket 161 to which reference has been made hereinabove.

Whereas the present invention is not concerned with the details of construction of the hydraulic pump 231 it will suffice for the purposes of the present disclosure to explain that although the direction of rotation of the pump shaft 234 remains constant, the pump 231 is provided with controls 243 regulable to effect delivery of hydraulic fluid under pressure to either one of two conduits 246 and 247 interconnecting the motor 230 and pump 231. Adjustment of the controls 243 to attain such optional delivery is had by means of a control lever 248 (Figs. 4 and 5) secured intermediate its ends to the shaft 249 of a control valve (not shown). When the lever 248 is in a horizontal position as illustrated in Fig. 4 the valve which it controls is in a neutral position, permitting the pump 231 to idle, i. e., operate freely without delivering fluid under pressure to either of the two conduits 246 or 247. When tipped clockwise as viewed in Fig. 4, the pump 231 is caused to deliver fluid under pressure to one of the conduits, say the conduit 246, whereupon the conduit 247 operates as a return line carrying fluid from the motor 230 back to the pump 231; and when the lever 248 is tipped counterclockwise the flow conditions are reversed, i. e., fluid under pressure is supplied to the conduit 247 and the conduit 246 operates as a return line.

Manipulation of the lever 248 to attain such control over the flow of hydraulic fluid from the pump 231 is attained by means of the wheel 199 which as hereinabove mentioned is rotatably mounted on the cabinet 198 at the top of the operator's control column 196. The stub shaft 251 (Fig. 8) whereby the wheel 199 is rotatably mounted on the front of the cabinet 198 is rigidly secured to the wheel 199 as by a set screw 252. A lever 253 similar in design to the lever 248 of the hydraulic motor 241, is rigidly secured to the stub shaft 251 inside the cabinet 198 as by a roll pin 254 extending through a sleeve 256 welded to the lever 253. Cables 257 and 257a extend from the ends of the lever 253, downward through the two outermost tubes 197 of the control column 196, below which the cables 257 and 257a are trained around sheaves 258 and 258a, respectively (Fig. 5). Both of the sheaves 258 and 258a are rotatably mounted on a suitable spindle 259 carried by the turntable frame 52. From the sheaves 258 and 258a the cables 257 and 257a lead to another set of sheaves 260 and 260a rotatable about vertical axes, permitting the cables 257 and 257a to lead horizontally to sheaves 261 and 261a (Fig. 4) rotatable about horizontal axes. The sheaves 261 and 261a are located below the hydraulic pump control lever 248 so that the cables 257 and 257a lead upward therefrom in position to be connected, through tension springs 262 and 262a, to the opposite ends of the lever 248. Thus it may be seen that by turning the wheel 199 in either direction the operator can cause similar and substantially coextensive turning of the hydraulic motor control lever 248. The operator is thus enabled to exercise full control over the hydraulic motor 230, causing the motor 230 to remain idle when the wheel 199 is in an intermediate position, as illustrated in Figs. 1, 3, 4, and 7, and to rotate in one direction when the wheel 199 is turned clockwise as viewed in Figs. 3 and 4 and causing the motor 230 to operate in the opposite direction when the wheel 199 is turned counterclockwise.

Inasmuch as the sprocket wheel 216 is held rigid with the tank 31 by its mounting on the stationary sleeve 72, and inasmuch as the driving sprocket wheel 233 connected to the sprocket wheel 216 by the chain 226 is carried on the turntable 51, operation of the hydraulic motor 230 in one direction will cause the turntable 51 to rotate in one direction about its vertical axis whereas operation of the hydraulic motor 230 in the other direction will cause reverse rotation of the turntable.

As shown in Fig. 5, a manually operable valve 266 interposed in the conduit 246 provides means for regulating the rate at which hydraulic fluid is supplied to the motor 230, and thereby restricting the maximum speed of rotation of the turntable 51. As an additional safety feature, the two hydraulic lines 246 and 247 are interconnected by a conduit 271 bypassing the hydraulic motor 230. Included in the bypass conduit 271 is an orifice fitting 272 (Fig. 12) comprising a tubular housing 273 interposed into the conduit 271 and having a passage 274 therethrough. The central portion 275 of the passage 274 is so restricted that only a relatively small flow of hydraulic fluid therethrough is possible. The function of this restricted orifice fitting 272 is to permit a small quantity of fluid to continue to flow through the motor 230 after the control lever 248 has been moved to a neutral position but at a restricted rate, thus permitting the turntable to start moving and also to come to rest gradually rather than so abruptly as to endanger the turning mechanism as might be the case in the absence of such cushioning means.

Means are provided for agitating the contents of the tank 31 so as to assure complete intermingling of the various liquids or the mixture of one or more liquids and solid particles in suspension therein, of which the tank's contents may be composed. For this purpose a tube 280 (Figs. 4, 5 and 11) leads from the fitting 176 through which the liquid spray material is fed from the pump 158 to the spray nozzle 183. This tube 280 extends downward through a bushing 281 threaded into the upper end of the T-fitting 152 and coaxially downward through the tubular sleeve 76. The lower end 282 of the tube 280 extends past the lower end 141 of the sleeve 76 and through a packing 283 suitably compressed within a stuffing box 284 carried by the plate 145 which defines the bottom of the sump 142 and separates the sump from the pressure chamber 147. The lower end 282 of the tube 280 communicates with the pressure chamber 147 so that part of the fluid supplied by the pump 158 will flow through the tube 280 into the pressure chamber 147 and thence through a tube 286 which extends upward and then radially outward inside the tank 31. A plurality of jetting nozzles 287 (Fig. 4) are provided on the outwardly extending tube 286 and are arranged to direct their jets obliquely into the body of liquid within the tank 31 and thereby effectively agitate the same to assure the contents being kept in a thoroughly mixed condition throughout any period during which the pump 158 is operated to withdraw liquid from the tank 31.

It is believed that the manner of operating the spraying machine of the present invention can be readily understood from the hereinabove description of its construction. It should be mentioned, however, that owing to its "straight through" design, the blower assembly 93 is unusually efficient in generating and directing an air stream of high velocity and so restricted, or "focused," that it is capable of penetrating the surrounding relatively still air to an unusually great distance. This characteristic of the spraying machine particularly adapts it for spraying tall trees such as the shade trees commonly employed for ornamental purposes in public parks and to line city streets.

Ease and accuracy of control are additional features adapting the apparent for such use as they assist in attaining application of the spray material accurately to a relatively restricted target area, such as the topmost branches of a single tall tree, with only a minimum dispersion of the spray material to other, adjacent objects where the spray material might prove objectionable. The nature of the controls under the command of the operator is such that his full control over the direction, considered both horizontally and vertically, is most easily and naturally attained. The controls closely resemble those in common use on light airplanes. By pushing the entire control rod assembly 196 forward, i. e., away from himself, the operator causes the jet issuing from the blower assembly to be lowered, whereas by drawing the control assembly 196 toward himself the operator effects raising the jet. By turning the wheel 199 to the right or clockwise as viewed in Figs. 3 and 10 the turntable is caused to rotate clockwise when viewed from above. Similarly, turning the wheel 199 counterclockwise likewise effects turning of the turntable counterclockwise. Hence, with only a minimum of practice, an operator is enabled to exercise directional control over the pesticide laden air stream instinctively, and thereby assure accurate delivery of the spray material to the desired target area with minimum danger of contaminating adjacent objects.

While I have disclosed my invention with the aid of a particular embodiment thereof, it will be understood that I do not wish to be limited to the specific constructional details shown and described, from which departure can be made without departing from the spirit and scope of the invention.

What I claim and desire to protect by Letters Patent is:

1. In pesticide applying apparatus, a blower assembly comprising a tubular casing open at both ends and a fan mounted within the casing for rotation about the longitudinal axis of the casing for ejecting an air stream from the casing, means mounting said casing for rotary motion about an axis extending transversely of the longitudinal axis of said casing, a drive shaft extending through a wall of the casing with the axis of the shaft coinciding with said transverse axis, and means operably connecting the fan rotor to the shaft to be rotated thereby.

2. Pesticide applying apparatus comprising a support mounted for rotary movement about a vertical axis, a tubular blower casing mounted on the support for rotary motion about a horizontal axis extending transversely of the casing, a fan rotor rotatably mounted within the casing for ejecting an air stream from the housing, means for introducing pesticide to the air stream, a drive shaft extending through a wall of the casing with the axis of the shaft coinciding with said transverse axis, means operably connecting the fan rotor to the shaft to be rotated thereby, and a motor mounted on the support and operatively connected to said drive shaft.

3. A blower for pesticide applying apparatus, comprising a tubular casing, a fan rotor rotatably mounted therein, axially aligned trunnions extending from opposite sides of the casing intermediate the length of the casing, journal bearings pivotally supporting said trunnions, a drive shaft extending rotatably through one of the trunnions and through a wall of the casing, and means operably coupling the fan rotor to the drive shaft to be rotated thereby.

4. An axial flow blower comprising a tubular casing, a fan mounted therein for rotation about an axis extending longitudinally of the casing, means supporting the casing for rotary motion about a transverse axis disposed intermediate the length of said casing, a drive shaft extending through a wall of the casing with the axis of said shaft coinciding with said transverse axis, and means operably connecting said fan to said drive shaft to be rotated thereby.

5. A blower comprising a casing, a fan rotatably mounted on the longitudinal axis of the casing, means mounting the casing for rotary movement about a horizontal axis transverse to the axis of said casing and offset from the center of gravity of the casing whereby said casing is urged by gravity to rotate about said axis, a drive shaft extending from the casing with the axis of the shaft coinciding with said transverse axis, and means connecting the fan to the drive shaft to be operably rotated thereby upon rotation of the shaft in the direction opposite that in which the casing is gravitationally urged.

6. Apparatus for directing an air stream comprising a blower casing, a fan rotatably mounted in fixed position therein, axially aligned trunnions extending laterally from the casing and offset from the center of gravity of the casing to create an unbalanced condition wherein the casing is urged by gravity to rotate in a predetermined direction about the axis of the trunnions, journal means rotatably supporting said trunnions, a drive shaft extending through one of said trunnions coaxially therewith into the interior of the casing, means operably connecting the fan to said drive shaft, and a motor mounted adjacent said casing and operatively connected to said drive shaft to rotate the fan and to apply torque to the casing in the direction about said axis opposite to said predetermined direction.

7. Air stream directing apparatus as in claim 6 wherein the unbalanced condition of the casing is equilibrated by the torque applied to the casing by the shaft when the casing is disposed in a position intermediate its two extreme positions of rotational adjustment about the axis of the trunnions.

8. Apparatus for directing an air stream comprising a blower casing, a fan rotatably mounted in fixed position therein, axially aligned trunnions extending laterally from the casing and offset from the center of gravity of the casing to create an unbalanced condition wherein the casing is urged by gravity to rotate in a predetermined direction about the axis of the trunnions, a support platform, means on said platform rotatably supporting said trunnions, a drive shaft extending through one of said trunnions coaxially therewith into the interior of the casing, means operably connecting the fan to said drive shaft, and a motor mounted adjacent said casing and operatively connected to said drive shaft to rotate the fan and to apply torque to the casing in the direction about said axis opposite to said predetermined direction, and control means movably mounted on said platform and operatively connected to said casing to turn the casing about the axis of said trunnions upon movement of the control means.

9. Air stream directing means as in claim 8 wherein the unbalanced condition of the casing is equilibrated by the torque applied to the casing by the shaft when the casing is in a position intermediate its two extreme positions of rotational movement about the axis of the trunnions, said casing being rotatable in either direction from said intermediate position by said control means.

10. Air stream directing apparatus comprising a blower casing, a fan rotatably mounted therein and supported thereon, means supporting said casing for pivotal movement about a horizontal axis extending transversely of the casing and offset from the center of gravity of the casing toward one end thereof, a drive shaft arranged with its axis coinciding with said transverse axis and extending into the interior of the casing, means operably connecting the fan to said drive shaft, and a motor mounted independently of the casing and operatively connected to the drive shaft to rotate the fan and to apply torque to the casing in the direction tending to raise the other end of the casing.

11. Pesticide distributing apparatus comprising a support mounted for rotary movement about a vertical axis, a casing mounted on the support for rotary movement about a transverse horizontal axis offset from the center of gravity of the casing whereby said casing is urged by gravity to rotate about said horizontal axis, a drive shaft extending from the casing with the axis of the shaft coinciding with said transverse axis, a fan rotatably mounted within the casing to eject an air stream from the casing, means for introducing insecticide into said air stream, and means connecting the fan to the drive shaft to be operably rotated thereby upon rotation of the shaft in the direction opposite that in which the casing is gravitationally urged.

12. A dirigible blower for directing an air stream, comprising a turntable mounted for rotation about a vertical axis, an air stream directing casing mounted on the turntable for rotary movement about a horizontal axis, means for ejecting a stream of air from the casing, powered mechanism for turning the turntable, means on the turntable defining an operator's station, means accessible from the operator's station for controlling the turntable turning means, an upstanding control lever mounted on the turntable for movement toward and away from the operator's station, and means connecting the air stream directing casing to the control lever to turn the casing about said horizontal axis in response to movement of the control lever.

13. A dirigible blower for directing an air stream, comprising a turntable mounted for rotation about a vertical axis, an air stream directing casing mounted on the turntable for rotary movement about a horizontal axis, means for ejecting a stream of air from the casing, powered mechanism for turning the turntable, means on the platform defining an operator's station, a control lever mounted on the turntable for pivotal movement toward and away from the operator's station about an axis adjacent the lower end of the lever, means actuated by the control lever for turning said air stream directing casing about said horizontal axis, a wheel rotatably mounted on the control lever, and control means for said turntable turning means operably connected to said wheel.

14. A dirigible air stream directing apparatus comprising a turntable mounted for rotary motion about a vertical axis, a blower assembly mounted on the turntable for rotary movement about a horizontal axis, means for ejecting a stream of air from the casing, a control lever pivotally mounted on the turntable and connected to the blower assembly to turn the same about said horizontal axis by movement of the lever, a motor carried by the turntable, means powered by the motor for turning the turntable, a hand wheel rotatably mounted on the control lever, and control means for said turntable turning means operably connected to said hand wheel.

15. Dirigible blower for directing a stream of gaseous material, comprising a rotatably mounted turntable platform, a blower assembly mounted on the platform for rotary motion about a horizontal axis and having a discharge orifice adapted to direct a stream radially with respect to said axis, an operator's seat mounted on the platform facing in a direction approximately corresponding to a horizontal projection of said jet, a control lever adjacent said seat and pivotally mounted adjacent its lower end on the platform, and means connecting the casing to the lever to be turned about said horizontal axis and thereby effect variation in the elevation of said stream in response to movement of the lever.

16. A dirigible blower for directing a stream of gaseous material, comprising a rotatably mounted turntable platform, powerered mechanism for turning the turntable, control means for said turning means, a blower assembly mounted on the platform for rotary motion about a horizontal axis and having a discharge orifice adapted to direct a stream radially with respect to said axis, an operator's seat mounted on the platform facing in a direction approximately corresponding to a horizontal projection of said stream, a control lever adjacent said seat and pivotally mounted adjacent its lower end on the platform, means connecting the casing to the lever to be turned about said horizontal axis and thereby effect variation in the elevation of said stream in response to movement of the lever, a hand wheel rotatably mounted on said control lever, and means operably connecting said control means to said hand wheel.

17. Pesticide distributing apparatus comprising a pesticide storage tank having a flat upper surface, a turntable platform rotatable above the tank, rollers supporting the platform on said flat surface, pesticide ejecting mechanism carried by said platform, and means for withdrawing pesticide from the tank and conveying the same to said ejecting mechanism.

18. Portable pesticide distributing apparatus comprising a vehicle including supporting wheels and a pesticide storage tank movably supported on the wheels, a journal bearing mounted on the tank with the axis of the bearing extending vertically, a turntable platform rotatable above the tank, a pivot extending rigidly downward from the platform and rotatably disposed in the bearing, rollers interposed between the platform and the tank and contributing to the support of the platform, a blower assembly mounted on the platform, and means for withdrawing pesticide from the tank and conveying the same to the blower.

19. Portable pesticide distributing apparatus comprising a vehicle including supporting wheels and a pesticide storage tank movably supported on the wheels, a journal bearing mounted on the tank with the axis of the bearing extending vertically, a turntable platform rotatable above the tank, a suction tube rigid with the platform and extending downward therefrom and through said bearing into the supply of pesticide within the tank, a blower assembly mounted on the turntable platform and including a fan, a motor mounted on the platform and operatively connected to said fan, a pump having an intake connected to said suction tube to withdraw insecticide from the tank, means for conveying insecticide from the pump to the blower, and means operably coupling the pump to said motor to be actuated thereby.

20. Pesticide distributing apparatus comprising a tank for a supply of pesticide, a turntable mounted on the tank for rotation about a vertical axis, a suction tube extending downward from the turntable into the supply of pesticide within the tank, pesticide ejecting means mounted on the turntable, a pump having an intake connected to said suction tube to withdraw insecticide from the tank, a discharge conduit leading from the pump to said ejecting means, and means for agitating the supply of pesticide in the tank including a nozzle mounted in the tank in position to direct its jet into the supply of pesticide, and a by-pass conduit leading from said discharge conduit to said nozzle.

21. Pesticide distributing apparatus comprising a tank for liquid pesticide, a turntable mounted thereon for rotation about a vertical axis, a suction tube disposed axially of the turntable and extending downward therefrom into a supply of liquid pesticide within the tank, pesticide ejecting means mounted on the turntable, a pump having an intake connected to said suction tube to withdraw liquid pesticide from the tank, a discharge conduit connecting the ejecting means to the pump, a nozzle mounted on the tank in a position adapting a jet issuing from the nozzle to agitate pesticide in the tank, and a conduit connecting the nozzle to the discharge conduit and extending co-axially through said suction tube.

22. Liquid distributing apparatus comprising a tank having a depression in its bottom wall defining a sump, a turntable mounted above the tank for rotation about a vertical axis passing through the sump, liquid ejecting means mounted on the turntable, a pump carried by the turntable, a first discharge conduit connecting the pump to the ejecting means, a suction tube connected at one end to the pump and having its other end rotatably disposed within said sump, means defining a closed pressure chamber below said sump, a second discharge conduit connected at one end to said first discharge conduit and extending coaxially through said suction tube and through said sump, the other end of the second discharge conduit opening into the pressure chamber, packing interposed between the second conduit and the bottom of the sump to maintain a fluid-tight seal therebetween, an outlet pipe communicating with said pressure chamber, and an agitator nozzle on the outlet pipe in position adapting a jet issuing from the nozzle to agitate liquid stored in the tank.

23. Pesticide distributing apparatus comprising a tank for storing a supply of liquid pesticide, a turntable mounted on the top of the tank for rotation about a vertical axis, a blower assembly mounted on the turntable, a motor mounted on the turntable and operatively connected to the blower assembly, a pump carried by the turntable, a first discharge conduit connecting the pump to the blower assembly, a suction tube connected at one end to the pump and extending downward from the turntable substantially co-axially thereof, the other end of the suction tube being immersed in the liquid pesticide stored in the tank, structural bracing members within the tank rigidly interconnecting walls of the same to distribute the weight of the turntable and the load carried thereby to said walls, and means for agitating liquid pesticide including a pressure chamber in the tank with the axis of the turntable extending through the pressure chamber, a second discharge conduit connected at one end to said first discharge conduit and extending downward from the turntable substantially co-axially thereof, the other end of said second discharge conduit communicating with the pressure chamber, sealing means interposed between the second discharge conduit and the pressure chamber, an outlet pipe leading from the pressure chamber and extending radially therefrom beyond said structural members, and a nozzle on said outlet pipe in position adapting a jet issuing from the nozzle to agitate pesticide stored in the tank.

24. Pesticide distributing apparatus comprising a support, a turntable mounted thereon for rotation about a vertical axis, pesticide ejecting means carried by the turntable, and means for turning the turntable to vary the direction in which pesticide is ejected including a wheel member mounted in fixed relation to said support and in coaxial alignment with the turntable, a wheel member rotatably mounted on the turntable, power transmitting means interconnecting said wheel members to effect turning the turntable with respect to the support upon rotation of said rotatable wheel member, and means for rotating said rotatable wheel member.

25. Pesticide distributing apparatus comprising a support, a turntable mounted thereon for rotation about a vertical axis, pesticide ejecting means carried by the turntable, and means for turning the turntable to vary the direction in which pesticide is ejected including a wheel member mounted in fixed relation to said support and in coaxial alignment with the turntable, a wheel member rotatably mounted on the turntable, power transmitting means interconnecting said wheel members to effect turning the turntable with respect to the support upon rotation of said rotatable wheel member, a reversible fluid motor operatively connected to said rotatable wheel member to rotate the same, a fluid pump, driving means for the pump, two hydraulic pressure transmitting conduits interconnecting said pump and said motor, means operable to direct fluid optionally through either of said conduits from the pump to the motor and permit return of fluid from the motor to the pump through the other conduit, a by-pass conduit interconnecting said pressure transmitting conduits, and means restricting flow through said by-pass conduit.

26. Pesticide distributing apparatus comprising a support, a turntable mounted thereon for rotation about a vertical axis, pesticide ejecting means carried by the turntable, and means for turning the turntable to vary the direction in which pesticide is ejected including a wheel member mounted in fixed relation to said support and in coaxial alignment with the turntable, a wheel member rotatably mounted on the turntable, power transmitting means interconnecting said wheel members to effect turning the turntable with respect to the support upon rotation of said rotatable wheel member, a fluid motor operatively connected to said rotatable wheel member to rotate the same, a fluid pump, driving means for the pump, a pressure conduit and a return conduit interconnecting the fluid motor and the fluid pump, and an adjustable valve interposed in one of said conduits to regulate maximum rate of operation of the fluid motor.

References Cited in the file of this patent

UNITED STATES PATENTS

| | | |
|---|---|---|
| 401,000 | Brandther | Apr. 9, 1889 |
| 857,923 | Coleman | June 25, 1907 |
| 1,864,198 | Johnson | June 21, 1932 |
| 2,116,539 | Payne | May 10, 1938 |
| 2,551,789 | Copley | May 8, 1951 |
| 2,561,432 | Tranter | July 24, 1951 |
| 2,613,109 | Walker | Oct. 7, 1952 |
| 2,685,476 | Spreng | Aug. 3, 1954 |

UNITED STATES PATENT OFFICE
CERTIFICATE OF CORRECTION

Patent No. 2,768,859                                                       October 30, 1956

Joseph M. Patterson

It is hereby certified that error appears in the printed specification of the above numbered patent requiring correction and that the said Letters Patent should read as corrected below.

Column 2, line 48, for "machine" read -- vehicle --; line 51, for "patern" read -- pattern --; column 9, line 2, for "apparent" read -- apparatus --.

Signed and sealed this 8th day of July 1958.

(SEAL)
Attest:

KARL H. AXLINE                                                   ROBERT C. WATSON
Attesting Officer                                            Commissioner of Patents